Oct. 2, 1956

W. J. WYLIE 2,764,839

RESILIENT HOLDER FOR FISHING FLIES

Filed Sept. 30, 1956

INVENTOR
*William J. Wylie*

BY *Mason, Fenwick & Lawrence*

ATTORNEYS

United States Patent Office

2,764,839
Patented Oct. 2, 1956

2,764,839

RESILIENT HOLDER FOR FISHING FLIES

William J. Wylie, Feeding Hills, Mass.

Application September 30, 1955, Serial No. 537,800

7 Claims. (Cl. 43—57.5)

This invention relates to a holder for fishing flies adapted for gripping the fly by the exposed portion of the hook with sufficient frictional pressure to maintain it in fixed position and out of contact with anything that might tend to distort the hackle.

The principal object of the invention is the provision of a fly holder which comprises fundamentally a continuous resilient wire bent at intervals to form an elongated series of preferably uniformly spaced, parallel loops, each having contiguous shank portions and a narrowly open bight portion, the shank portions of all the loops of said series lying in a common base plane and the axes of said bight portions lying in a common plane angularly disposed with respect to said base plane, alternate bight portions being axially displaced at 90° to the other alternate bight portions so that with respect to any pair of adjacent loops, the bight portion of one enters edgewise into the loop of the other when the bight portions of the pair are pressed together against tortional resistance derived from their shank portions, the inner bight portion forming an eye beyond the embracing bight portion, into which the hook of the fly may be passed and clampably held by tortional force when the pair of bight portions are released.

Another object of the invention is to embody a fly holder as described, in the form of a hatband.

Still another object of the invention is to incorporate the invention in a fly box.

Other objects of the invention will appear as the following description of a preferred and practical embodiment thereof proceeds.

In the drawing which accompanies and forms a part of the following specification, and throughout the figures of which the same characters of reference have been used to designate identical parts:

Figure 1:
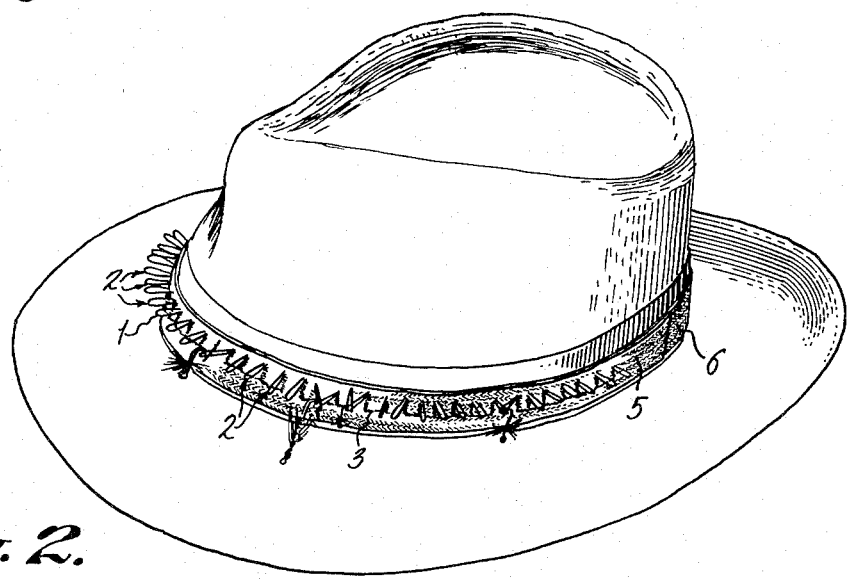
Figure 1 is a perspective view of a fly holder embodying the principles of the invention, incorporated in a hatband.
Figure 2:
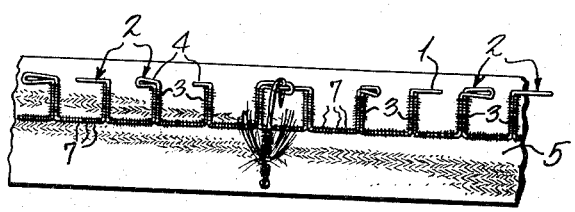
Figure 2 is a fragmentary view showing a portion of the hatband with a portion of the fly holder stitched thereto.
Figure 4:
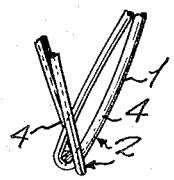
Figure 4 is a fragmentary view, partly in section, illustrating the clamping relationship of the intersecting bight portions of adjacent loops of the fly holder.
Figure 3:
Figure 3 is a plan view of the portion of the fly holder shown in Figure 2.

Referring now in detail to the invention, the numeral 1 represents a resilient wire which is bent out perpendicularly to its general longitudinal extent, and preferably at uniform intervals to form the loops, which as a whole are designated by the numeral 2. Said loops have contiguous shank portions 3 and narrowly open bight portions 4. The shank portions 3 emanate from the wire 1, so as to lie in a common base plane. In the embodiment shown in Figures 1, 2 and 3, the fly holder is secured to a flexible band 5, part of which may be elastic as shown at 6, so that it will fit any sized hat, as suggested in Figure 1. The shank portions 3 are stitched to the hatband by the stitching 7, so that the aggregate shank portions define a supporting base for the fly holder. The bight portions 4 are angularly deflected with respect to the shank portions 3, the axes of said bight portions lying in a plane which is at a suitable angle to the base plane of the fly holder. In that form which is illustrated in Figures 1 to 3, the axes of the bight portions are in a plane perpendicular to the base plane so that the bight portions stand out at right angles to the base plane. The bight portions of alternate loops are axially displaced at 90° to the other alternate loops so that when any adjacent pair of loops is pressed together with the fingers, against tortional resistance derived from the shank portions of said loops, one shank portion will enter edgewise into and through the adjacent bight portion, forming an eye on the opposite side of the embracing portion into which the exposed hook of the fly may be passed. Then when the pair of bight portions is released, they will tend to resume their normal position of parallelism, causing the hook of the fly to be clampably held within the eye by mutual opposed pressure. The resiliency of the wire is such that the fly will be maintained under frictional pressure in any position into which it may be placed. In order to release the fly, it is merely necessary to press the intersecting bight portions together so as to free the fly from clamping pressure, and to remove it. It is obvious that the manipulation required for inserting or removing the fly is such that the fingers need not make contact either with the body of the fly or the hackle, and consequently, neither the body or hackle need be mussed or ruffled.

It is obvious that a fly holder of the type described may be made in any length, if desired, and cut into suitable smaller lengths, as required.

Figure 5:
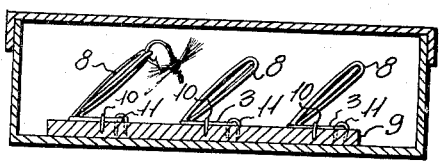
Figure 5 is a transverse sectional view through a fly box illustrating a slightly modified form of the invention applicable to use in the fly box.

In that form of the invention shown in Figure 5, suitable lengths 8 of the fly holder are secured to a rigid base 9 instead of to a flexible base such as is represented by the hatband 5. In this instance the fly holder is secured to the base by staples 10, which embrace the shank portions 3, and also by staples 11, which hold down the portions of the wire between the angularly diverted shank portions. In that form of the invention shown in Figure 5, instead of the bight portions being perpendicular to the shank portions, their axes lie in planes which make an acute angle with the plane of the shank portions 3, thus permitting the use of a shallow box, and at the same time preserving all of the convenience and advantages of the form of fly holder shown in Figures 1, 2 and 3.

In this invention it is obvious that by applying more or less pressure to the loops of a pair, the eye may be enlarged to any extent necessary for the insertion of the hook of the fly so as to make it easy to insert the fly, regardless of whether one has good or poor eyesight, and also to facilitate the insertion or removal of the fly in darkness.

While I have in the above description defined what I have found to be practical embodiments of the invention, it will be understood by those skilled in the art that the specific details of construction as described, are by way of example and not to be construed as necessarily limiting the scope of the invention.

What I claim is:

1. Holder for fishing flies comprising a resilient wire bent at spaced intervals to provide a series of parallel spaced loops, the shank portions of the loops of said series being in a common plane embracing the axis of the wire, alternate loops being axially displaced through 90° relative to the other alternate loops whereby when adjacent loops are pressed together one enters edgewise into the other forming therewith an eye therebeyond, with closing bias drived from the resiliency of the wire.

2. Holder for fishing flies comprising a resilient wire bent at spaced intervals to provide a series of parallel spaced loops, the shank portions of a loop being contiguous, said shank portions being substantially in a common plane embracing the axis of the wire, alternate loops being axially displaced through 90° relative to the other alternate loops, whereby when adjacent loops are pressed together one enters edgewise into the other forming therewith an eye therebeyond, with closing bias derived from the resiliency of the wire.

3. Holder for fishing flies comprising a resilient wire bent at spaced intervals to provide a series of parallel spaced loops, the shank portions of a loop being contiguous, said shank portions being substantially in a common plane embracing the axis of the wire, alternate loops being axially displaced through 90° relative to the other alternate loops, whereby when adjacent loops are pressed together one enters edgewise into the other forming therewith an eye therebeyond, with closing bias derived from the resiliency of the wire, a base, and means engaging the shank portions of said loops for anchoring said holder to said base.

4. Holder for fishing flies comprising a continuous resilient wire bent at intervals to form an elongated series of preferably uniformly spaced parallel loops, each having contiguous shank portions and a narrowly open bight portion, the shank portions of all the loops of said series lying in a common base plane and the axes of the bight portions lying in a common plane angularly disposed with respect to said base plane, alternate bight portions being angularly displaced at 90° to the other alternate bight portions so that with respect to any pair of adjacent loops, the bight portion of one enters edgewise through the loop of the other when they are pressed together contra to their resilient bias.

5. Holder for fishing flies as claimed in claim 4, including a base member having a face thereof in the plane of said shank portions, engaging the latter, and means securing said shank portions to said base.

6. Holder for fishing flies as claimed in claim 4, including a base member having a face thereof in the plane of said shank portions engaging said shank portions, means securing said shank portions to said base, the plane commonly embracing said shank portions and the plane commonly embracing the axes of said bight portions forming an acute dihedral angle.

7. Holder for fishing flies as claimed in claim 5, said base being a flexible hatband.

References Cited in the file of this patent

UNITED STATES PATENTS

| | | |
|---|---|---|
| 616,657 | Gaines | Dec. 27, 1898 |
| 2,222,096 | Walthour | Nov. 19, 1940 |
| 2,229,292 | Heiner | June 21, 1941 |
| 2,268,920 | Baumgartner | Jan. 6, 1942 |
| 2,501,443 | Fitzsuninon | Mar. 21, 1950 |